United States Patent
Hristov et al.

(10) Patent No.: US 8,203,296 B2
(45) Date of Patent: Jun. 19, 2012

(54) BLDC MOTORS

(75) Inventors: Hristo Hristov, Sofia (BG); Rumen Peev, Sofia (BG); Kalin Petrov, Sofia (BG)

(73) Assignee: Melexis NV, Leper (BE)

( * ) Notice: Subject to any disclaimer, the term of this patent is extended or adjusted under 35 U.S.C. 154(b) by 711 days.

(21) Appl. No.: 12/275,066

(22) Filed: Nov. 20, 2008

(65) Prior Publication Data
US 2009/0134824 A1 May 28, 2009

(30) Foreign Application Priority Data
Nov. 20, 2007 (GB) .................................. 0722740.8

(51) Int. Cl.
*H02P 6/14* (2006.01)
(52) U.S. Cl. ............... 318/400.19; 311/400.01; 311/700; 311/400.42
(58) Field of Classification Search ............. 318/400.19, 318/400.01, 400.42, 700
See application file for complete search history.

(56) References Cited

U.S. PATENT DOCUMENTS

| | | | |
|---|---|---|---|
| 4,746,844 A | 5/1988 | MacKelvie et al. | |
| 4,772,839 A | 9/1988 | MacMinn et al. | |
| 4,928,043 A | 5/1990 | Plunkett | |
| 4,992,710 A | 2/1991 | Cassat | |
| 5,001,405 A | 3/1991 | Cassat | |
| 5,097,190 A | 3/1992 | Lyons et al. | |
| 5,134,349 A * | 7/1992 | Kruse | 318/400.34 |
| 5,144,209 A * | 9/1992 | Inaji et al. | 318/400.04 |
| 5,191,269 A * | 3/1993 | Carbolante | 318/400.23 |
| 5,191,270 A | 3/1993 | McCormack | |
| 5,525,874 A * | 6/1996 | Mallarapu et al. | 318/400.13 |
| 6,011,368 A | 1/2000 | Kalpathi et al. | |
| 6,072,289 A * | 6/2000 | Li | 318/400.19 |
| 6,107,772 A | 8/2000 | Liu et al. | |
| 6,825,646 B2 | 11/2004 | Colombo | |
| 7,180,262 B2 | 2/2007 | Consoli et al. | |
| 8,030,867 B1 | 10/2011 | Allison, III | |
| 2004/0056627 A1 | 3/2004 | Grasso et al. | |

* cited by examiner

*Primary Examiner* — Walter Benson
*Assistant Examiner* — David Luo
(74) *Attorney, Agent, or Firm* — Leydig, Voit & Mayer, LLP; Gerald T. Gray

(57) ABSTRACT

A 2-phase BLDC motor is driven by a trapezoidal waveform. For one-half of the motor rotation period T, the phase is driven by the trapezoidal waveform and for the other half-period, the coil remains undriven. An up down counter is operable to increment at a first frequency $f_1$ and to decrement at a second frequency $f_2$. Incrementing operation is initiated at the start of the driven period of the waveform and stopped at the start of the down slope of the waveform. Decrementing operation is initiated at the start of the down slope of the waveform and stopped at the end of the down slope. The ratio of frequencies $f_1:f_2$ is used to measure the relative duration of the slope to the driven period and is selected to mirror the desired ratio of slope duration:driven period duration.

12 Claims, 4 Drawing Sheets

BLDC MOTORS

BACKGROUND

The present invention relates to a method of controlling the operation of a brushless DC (BLDC) electric motor and to a motor operable in accordance therewith.

BLDC motors are used in a wide variety of applications including as cooling fans. In operation, the coils in a BLDC motor are driven by a current flowing in one direction or the reverse direction, the direction of the current being controlled in response to signals from a sensor detecting the rotational position of the BLDC motor rotor. Typically the position sensor is a Hall effect device.

Unfortunately, over part of their speed range, BLDC motors are prone to generate significant audible noise generated in the armature of the motor by the switching off of the stator coils.

This noise can be reduced by 'smooth' or 'soft' switching between coils and by controlling the ramp up/down slopes of the trapezoidal driving waveforms for the coils. Soft switching may be achieved by connecting capacitors in parallel with the outputs of the drive circuitry or by designing the drive circuitry to drive with a defined trapezoidal waveform. The provision of a capacitor in parallel with the output reduces the efficiency of the motor.

As the absolute magnitude of the waveforms is defined by the supply voltage slope control is achieved by varying the slope duration. Excessive slope duration can reduce the efficiency of the overall system by reducing the effective drive current whilst minimal slope duration can increase audible vibration in the coils and other mechanical parts. Typically, the optimum slope duration for minimizing audible noise in the range of interest varies with rotation rate. In one solution, a fixed slope duration is adopted, the selected duration being optimized for an desired rotational rate. In another solution, the waveform generated by the Hall effect device is amplified and clipped to produce an approximately trapezoidal waveform. Such an arrangement can be used to produce a variation in the slope of the drive. At slow rotation rates, this can reduce the efficiency of the system since the waveform rises unnecessarily slowly. Another drawback is that this solution requires a linear amplification chain from the magnetic sensor to the output drivers (including both of them) which is hard to achieve especially for the output drivers. Moreover it is inapplicable in a two-coil, open drain output driver.

It is therefore desirable to provide systems and methods for controlling a brushless DC motor that at least partially overcomes or alleviates the above problems.

SUMMARY

According to a first aspect of the present invention there is provided a method of controlling the slope duration of a driving waveform for a brushless DC motor, the method comprising: detecting the start of the up slope of a new driven period of a driving waveform and activating an up-down counter in to count in a first direction at a first frequency in response thereto; detecting the start of the down slope of said driven period of said driving waveform and activating the up-down counter to count in a reverse direction at a second frequency in response thereto; detecting the end of the down slope of said driven period of said driving waveform and stopping the up-down counter in response thereto; determining the value of the counter when stopped; and thereby determining whether the slope duration should be increased or decreased.

Using the above method it is possible, by appropriate selection of the first and second frequencies, to determine at any particular time whether the down slope duration is greater or lesser than a desired proportion of the driven period duration. Accordingly, the slope duration can then be increased or decreased as required.

Preferably, the ratio of the second frequency to the first frequency is substantially equal to the desired ratio of the driven period to slope duration. The ratio may be preset. In alternative embodiments, the ratio may be controllably varied.

In a typical motor, the optimum slope duration in the audible noise range of operation may be around 10% of the phase duration. In such circumstances the second frequency of the counter is preferably ten times the first frequency of the counter.

The waveforms may be generated under the direction of a digital control unit. The up-down counter may be provided within the digital control unit. The up-down counter may be reset for each successive driven period.

The value of the count when stopped may be used to increment or decrement a slope duration control block as required. The slope duration control block may be provided within the digital control unit. The slope duration may be varied, if required, by the slope duration control block by a single preset increment or decrement for each driven period. This helps to maintain stable operation.

The driving waveform may be a trapezoidal or substantially trapezoidal waveform. The driving waveform may be a truncated sinusoid.

According to a second aspect of the present invention there is provided a BLDC motor operable in accordance with the method of the first aspect of the present invention.

The motor of the second aspect of the present invention may incorporate any or all features of the first aspect of the invention as desired or as appropriate. This thus provides a BLDC motor operable to variably control of the slope duration of the driving waveform with respect to motor speed.

The BLDC motor may be a single phase BLDC motor. In alternative embodiments, the BLDC motor may have multiple (i.e., two or more) phases. The BLDC motor may incorporate a digital motor control unit. If required or desired, one or more other units may additionally be incorporated in order to implement the method of the first aspect of the present invention.

The slope duration may be measured and controlled by one or more up-down counters. In one embodiments, there may be a first control counter and a second output counter. The first counter is operable to receive timing signals from one or more oscillators. The timing signals allow the first counter to count at the desired frequency. The second counter may be operable to increment or decrement in response to the output of the first counter and/or the motor control unit. In a preferred embodiment, the second counter may be operable to increment or decrement only once per driving period, in response to the motor control unit. This increment or decrement may be by one unit per driving period. This helps to maintain stability. The second counter may be connected to a digital to analogue converter. The digital to analogue converter may be operable to convert the output of the second counter to a control signal. The control signal may be connected to means for controlling the slope duration.

The digital to analogue converter may be an expanding digital to analogue converter. This enables accuracy to be maintained over a wide range of different integrating currents (corresponding to different slope durations). This also improves the minimum response time between different slope durations.

According to a third aspect of the present invention there is provided a BLDC motor comprising: a primary driving power source; a power transistor operable to control the operation of the primary driving power source; a motor control unit operable to control the operation of the driving transistor; a negative feedback loop provided around said power transistor, the negative feedback loop also incorporating an integrating capacitor wherein the integrating capacitor is operable to integrate and input from a secondary power source.

The presence of the integrating capacitor in the negative feedback loop allows the smooth switching of the driving waveform, with a defined slope duration and is controllable independent of load variation. Additionally, it has less detrimental effect on efficiency than the prior art design having a capacitor in parallel with the power source.

The BLDC motor may be a single phase BLDC motor. In alternative embodiments, the BLDC motor may have multiple (i.e., two or more) phases. The motor control unit may be a digital motor control unit.

The secondary power source may connect to the integrating capacitor via one or more current sources. The current sources may be variable current sources. The output of the current sources may be controllably varied in response to signals from a connected unit. The connected unit may be the motor control unit or may be a distinct unit under the control of the motor control unit.

The negative feedback loop may also comprise a voltage buffer. The voltage buffer is preferably a buffering amplifier. This decouples the motor control unit from the integrating capacitor. A second buffer or gate driver may be provided between the motor control unit and the negative feedback loop. This may have limited driving capacity and may act as a weak driver to pull the gate of the power transistor either to ground or to Vdd at the end of a transition.

The primary and secondary power sources may be internal power sources or may be implemented by connections to external power sources.

In other embodiments, the BLDC motor of the third aspect of the present invention may be operable in accordance with the method of the first aspect of the present invention. This would provide a motor implementing both slope control and soft switching. In such an embodiment, the motor of the third aspect of the present invention may incorporate any or all features of the method of the first aspect of the present invention or of the motor of the second aspect of the present invention as desired or as appropriate.

BRIEF DESCRIPTION OF THE DRAWINGS

In order that the present invention is more clearly understood, one embodiment is described further below, by way of example only, and with reference to the accompanying drawings, in which.

DETAILED DESCRIPTION

Figure 1:
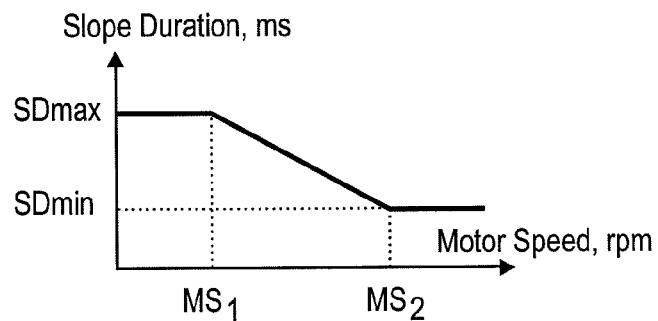
FIG. 1 is a schematic diagram illustrating the optimum slope duration with respect to motor speed.

BLDC motors driven by square waveforms commonly generate significant audible noise over part of their operating speed range. In order to limit this noise, it is necessary to use trapezoidal waveforms and to control the duration of the ramp up/down slopes of the driving waveform. Turning now to FIG. 1, an illustration of the variation of the optimum slope duration with respect to motor speed is shown. In the FIG. $MS_1$ and $MS_2$, represent the lower and upper motor speeds wherein control of the slope duration is required. At speeds above $MS_2$ the slope duration can remain fixed at $SD_{min}$ without adverse effect on audible noise. Similarly at speeds below $MS_1$, the slope duration can remain fixed at $SD_{max}$ without adverse effect on audible noise. In between $MS_1$ and $MS_2$, the optimum slope duration is substantially inversely proportional to motor speed. More conveniently, the optimum slope duration is expressed as a proportion of the duration of the driven portion of the waveform and might typically be of the order of 10%.

Figure 2:
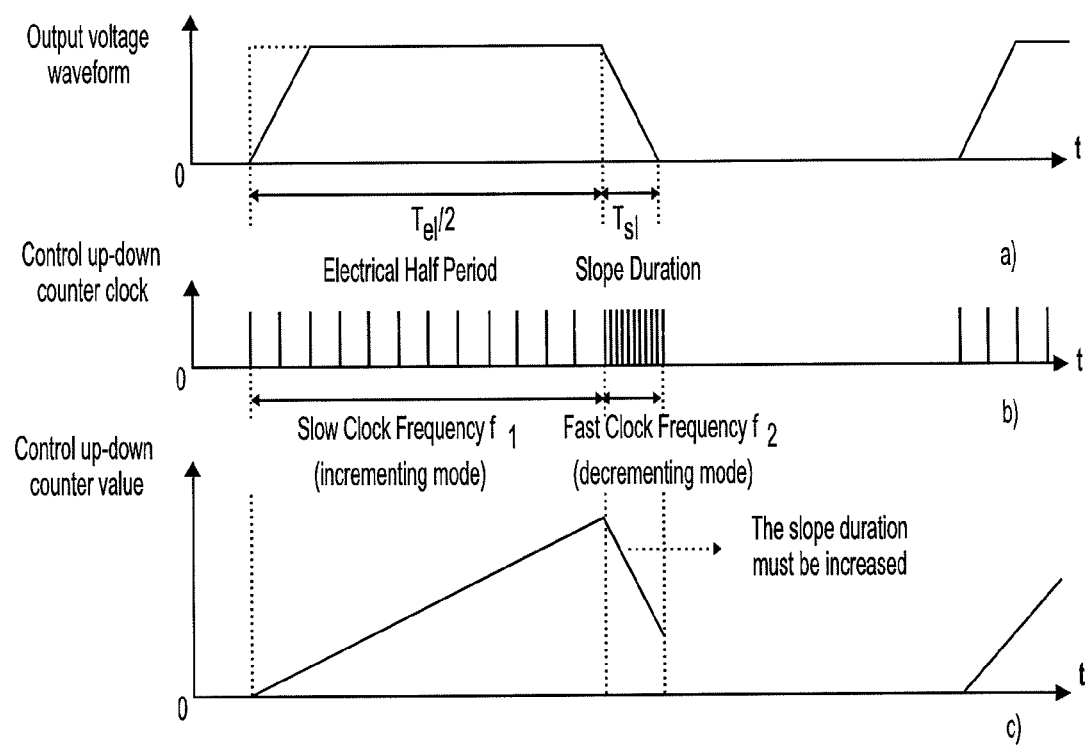
FIG. 2a is a schematic illustration of a trapezoidal driving waveform for one phase of a two phase BLDC motor.
FIG. 2b is a schematic illustration of the clock counts in operation according to the method of the present invention for controlling the slope duration of the trapezoidal driving waveform.
FIG. 2c is a schematic illustration of the counter output corresponding to the clock counts of FIG. 2b.

The present invention provides a control method by means of which the slope duration can be varied as required with respect to motor speed. The method is illustrated in FIG. 2.

Turning first to FIG. 2a, a trapezoidal driving waveform for one phase of a 2-phase BLDC motor is shown. For one-half of the motor rotation period T, the phase is driven by the trapezoidal waveform and for the other half-period, the coil remains undriven. Accordingly, if the optimum slope duration is around 10% of the duration of the driven portion, then it is of the order of T/20.

Turning now to FIG. 2b, the relative duration of the slope to the duration of the driven period is measured by use of an up-down counter. The up-down counter is operable to increment at a first frequency $f_1$ and to decrement at a second frequency $f_2$. Incrementing operation is initiated at the start of the driven period of the waveform and stopped at the start of the down slope of the waveform (or, if desired at the start of the up slope of another (the other for a two-coil system) output's driving waveform). Decrementing operation is initiated at the start of the down slope of the waveform and stopped at the end of the down slope (also the end of the driven period of the waveform). In a multi-coil system, the reverse counting may alternatively be stopped at the intercept point of the two output waveforms.

The ratio of frequencies $f_1:f_2$ is used to measure the relative duration of the slope to the driven period and is selected to mirror the desired ratio of slope duration:driven period duration. If the ratio of frequencies $f_1:f_2$ is equal to the ratio slope duration:driven period duration then the counter should register zero when stopped. If, however, the counter output is less than zero, it indicates that the slope duration is greater than the desired duration. Conversely, if the counter output is greater than zero, it indicates that the slope duration is less than the desired duration. This situation is illustrated in FIG. 2c wherein the counter value is plotted. As can be seen, the counter is stopped before it has counted back down to zero and thus the slope duration is less than the desired duration and should be increased.

As the value of the remaining count indicates not only whether the slope duration is too long or too short, but also by how much. As such, the output of the counter can be used to increment/decrement the control register of the waveform generator for the motor to vary the slope duration as required.

Figure 3:
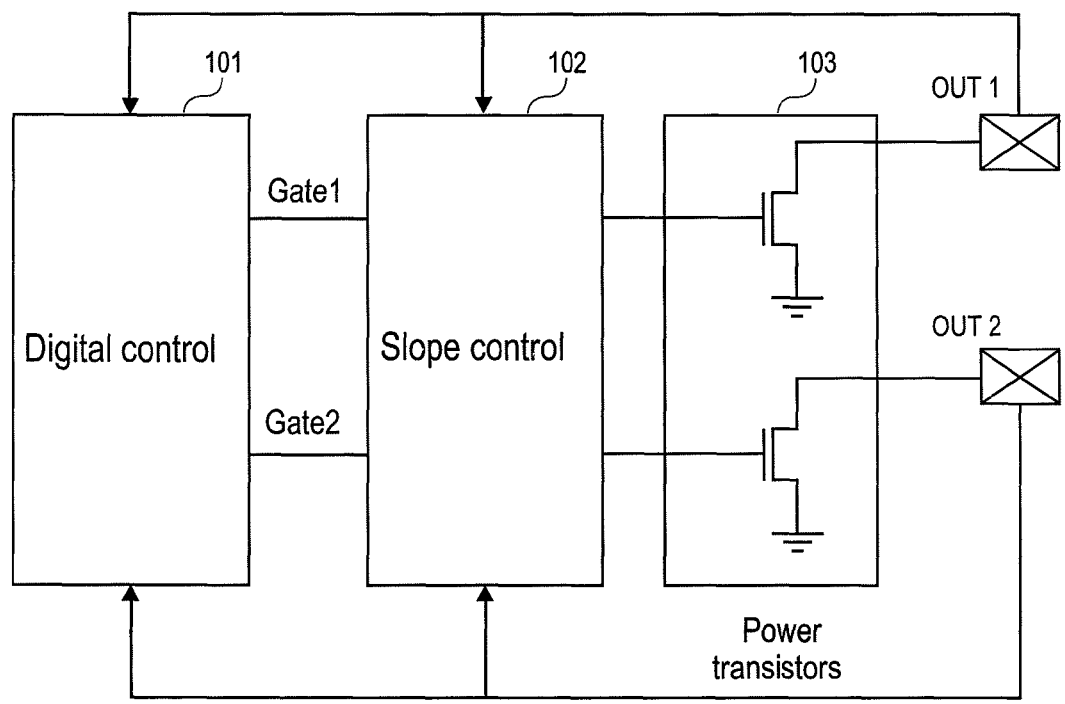
FIG. 3 is a simplified schematic block diagram of a driving circuit for a BLDC motor incorporating a slope control according to the present invention.

A simplified driving circuit 100 for implementing this method is shown in FIG. 3. In the circuit 100, a digital control unit 101 is connected both to coil driving outputs OUT1 and OUT2 and two a slope control unit 102. The slope control unit 102 is connected to driving transistors 103 for each output OUT1, OUT2. In this manner the slope control 102 can control driving transistors 103 in such a manner as to vary the slope of the driving waveform.

Figure 4:
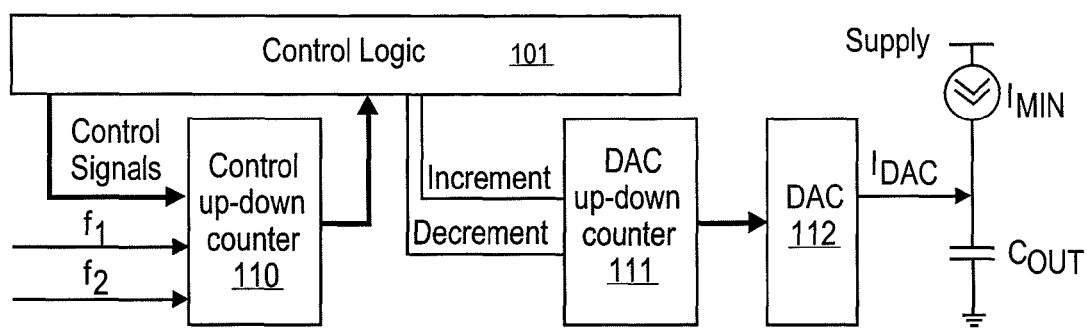
FIG. 4 is a schematic block diagram illustrating how slope control according to the present invention may be implemented.

Turning now to FIG. 4, an illustration of the components of digital control 101 operable to generate a control signal for slope control 102 is shown. A control up-down counter 110 is provided. This counter is operable to receive timing signals $f_1$, $f_2$, enabling counter 110 to generate count signals at rate $f_1$ or $f_2$ as desired. The signals $f_1$, $f_2$ may be generated by any suitable means including an oscillator (not shown).

The control counter 110 is operable to output count signals to the control unit 101 and is operable to switch the rate of these count signals in response to control unit 101. During incrementing operation, the control unit receives count signals from counter 110 at rate $f_1$. During decrementing operation, the control unit receives count signals from counter 110 at rate $f_2$. At the end of the driving period, the control unit increments a second counter 111 up or down by a single unit (more rapid updating can reduce the stability of the system) depending on the status of the count of first counter 110.

The output of the second counter 111 is connected to a digital to analogue converter 112. In response to the level of the second counter 111 input at the end of the decrementing phase, the digital to analogue converter 112 generates a current signal $I_{DAC}$. At the end of a driving period, the second counter 111 is updated and a consequent change in $I_{DAC}$ is observed. The DAC current $I_{DAC}$ is integrated over an integrating capacitor to produce a linear slope $dU_c(t)=(1/C)*\text{int}(I_{DAC}(t)*dt)$. Accordingly, the current $I_{DAC}$ is thus used to control the slope duration of the driving waveform. $I_{MIN}$ shown in FIG. 3 is a constant DC current. $I_{MIN}$ is provided to ensure there will be a slope even when the DAC 112 output is 0.

Typically, $I_{DAC}$ may be proportional to the external Vdd in order to respond quickly in changes of the supply voltage. As the system is a feedback loop, it requires some time to settle or "lock" to the correct value of the slope. Having an $I_{DAC}$ proportional to Vdd allows the slope will settle to its final value very fast when the supply voltage is changed, assuming of course that the loop had already locked to a desired slope duration before the supply changes.

Figure 5:
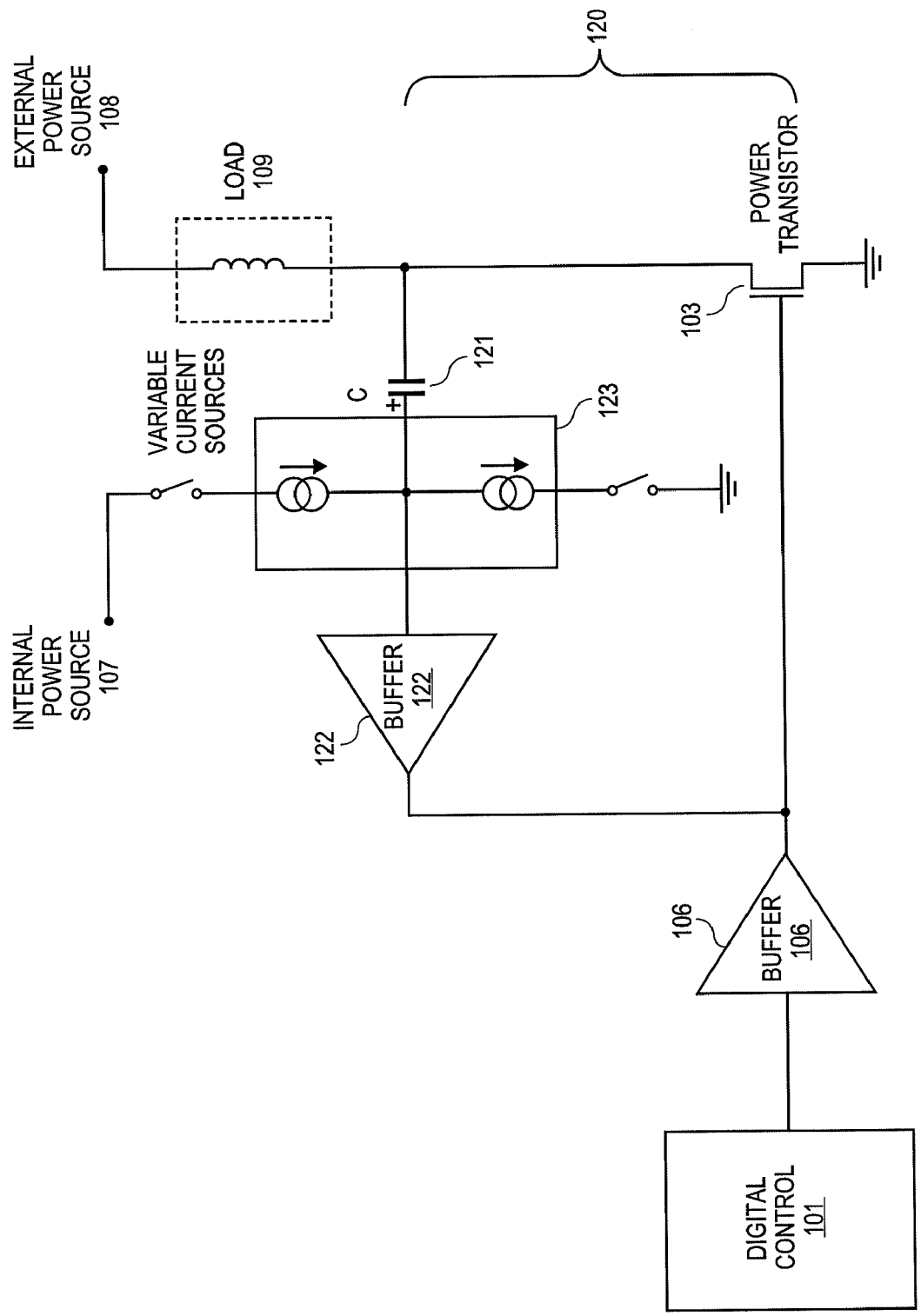
FIG. 5 is a schematic block diagram of a driving circuit for a BLDC motor incorporating soft switching according to the present invention.

FIG. 5 illustrates driving circuitry for a BLDC motor incorporating soft switching according to the present invention. In the example shown power transistor 103 is controlled by digital control unit 101. The power transistor 103 is operable to control the application of a primary driving power source 108 (typically a voltage source) to a load 109. In practice, this means the power transistor 103 is operated by the control unit 101 to vary the power applied by power source 108 in accordance with the desired driving waveform. This results in the desired driving waveform being applied to the coil, which is represented by load 109. The power source 108 may be an external current source.

The negative feedback loop 120 is connected around the power transistor 103. The loop 120 comprises a buffer 122 and an integrating capacitor 121. A pair of variable current sources 123 are connected between the buffer 122 and the capacitor 121. The current sources 123 are powered by a second power source 107, which may be an internal power source. The current from the current sources 123 is integrated by capacitor 121. As a result, this moderates rapid switches of the power transistor 103 leading to smooth or soft switching of the driving waveform, reducing noise. Buffer 122 is also operable to decouple the capacitor 121 from the control unit 101. A second buffer 106 is provided to act as a weak driver to pull the gate of the power transistor 103 either to ground or to Vdd at the end of a transition.

Figure 6:
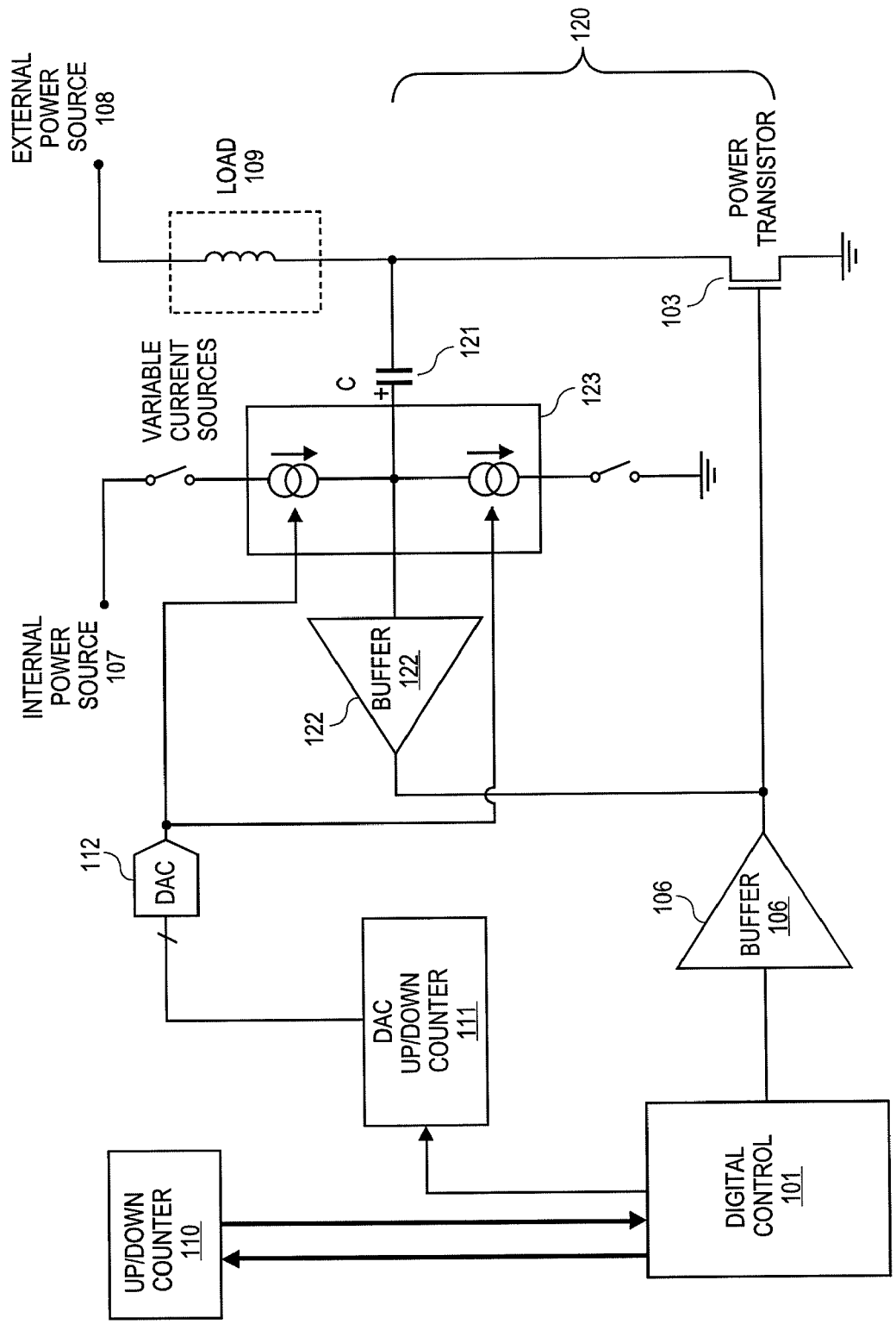
FIG. 6 is a schematic block diagram of a driving circuit for a BLDC motor incorporating both slope control and soft switching according to the present invention.

In FIG. 6, a further embodiment is shown. In this case, the driving circuitry enables both soft switching and active slope control as described in the present invention to be implemented. This varies from the embodiment of FIG. 5 in that slope control unit 102 is also provided. In the example of FIG. 6, this is represented by the up-down counter 111 and digital to analogue converter 112. These components are operable in the manner described in relation to FIG. 4. In the present example, however, the output current $I_{DAC}$ is used to control variable current sources 123 and thus control the slope duration in addition to softening waveform switching. In alternative embodiments, it may be possible for the digital to analogue converter 112 to act directly as a variable current source.

It is of course to be understood that the present invention is not to be restricted to the details of the above embodiment which is described by way of example only.

What is claimed is:

1. A method of controlling the slope duration of a driving waveform for a brushless DC motor, the method comprising:
   detecting the start of the up slope of a new driven period of a driving waveform and activating an up down counter to count in a first direction at a first frequency in response thereto;
   detecting the start of the down slope of said driven period of said driving waveform and activating the up down counter to count in a reverse direction at a second frequency in response thereto;
   detecting the end of the down slope of said driven period of said driving waveform and stopping the up down counter in response thereto;
   determining the value of the counter when stopped; and
   determining whether the slope duration should be increased or decreased.

2. A method as claimed in claim 1 wherein the ratio of the second frequency to the first frequency is substantially equal to the desired ratio of the driven period to slope duration.

3. A method as claimed in claim 1 wherein the waveforms are generated under the direction of a digital control unit and the up down counter is provided within the digital control unit.

4. A method as claimed in claim 1 wherein the up down counter is reset for each successive driven period.

5. A method as claimed in claim 1 wherein the value of the count when stopped is used to increment or decrement a slope duration control block as required.

6. A method as claimed in claim 1 wherein the driving waveform is a substantially trapezoidal waveform or a truncated sinusoid.

7. A BLDC motor comprising operable in accordance with the method of claim 1.

8. A BLDC motor as claimed in claim 7 wherein the BLDC motor is a single phase BLDC motor or a multiple phase BLDC motor, and includes a digital motor control unit.

9. A BLDC motor as claimed in claim 7 wherein there is a first control counter and a second output counter, the first counter operable to receive timing signals from one or more oscillators and the second counter operable to increment or decrement in response to the output of the first counter and/or the motor control unit.

10. A BLDC motor as claimed in claim 9 wherein the second counter is operable to increment or decrement only once per driving period and the increment or decrement is by one unit per driving period.

11. A BLDC motor as claimed in claim 9 wherein the second counter is connected to a digital to analogue converter operable to convert the output of the second counter to a control signal, the control signal being connected to means for controlling the slope duration.

12. A BLDC motor comprising:
   a primary driving power source;
   a power transistor operable to control the operation of the primary driving power source, the power transistor being connected directly to said primary driving power source;
   a motor control unit operable to control the operation of the driving transistor;
   a negative feedback loop provided around said power transistor, and
   the negative feedback loop including an integrating capacitor wherein the integrating capacitor is operable to integrate an input from a secondary power source,
   wherein the motor is operable to:
      detect the start of the up slope of a new driven period of a driving waveform and activating an up down counter to count in a first direction at a first frequency in response thereto;
      detect the start of the down slope of said driven period of said driving waveform and activating the up down counter to count in a reverse direction at a second frequency in response thereto;
      detect the end of the down slope of said driven period of said driving waveform and stopping the up down counter in response thereto;
      determine the value of the counter when stopped; and
      determine whether the slope duration should be increased or decreased.

* * * * *